(12) United States Patent
Yoshida

(10) Patent No.: US 9,032,761 B2
(45) Date of Patent: May 19, 2015

(54) POROUS GLASS MATRIX PRODUCING BURNER AND POROUS GLASS MATRIX PRODUCING METHOD

(71) Applicant: Shin-Etsu Chemical Co., Ltd., Tokyo (JP)

(72) Inventor: Makoto Yoshida, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 181 days.

(21) Appl. No.: 13/653,419

(22) Filed: Oct. 17, 2012

(65) Prior Publication Data
US 2013/0091900 A1    Apr. 18, 2013

(30) Foreign Application Priority Data
Oct. 18, 2011    (JP) .................................. 2011-229166

(51) Int. Cl.
   C03B 37/018    (2006.01)
   C03B 37/014    (2006.01)

(52) U.S. Cl.
   CPC ......... C03B 37/0142 (2013.01); *C03B 2207/06* (2013.01); *C03B 2207/12* (2013.01); *C03B 2207/14* (2013.01); *C03B 2207/42* (2013.01)

(58) Field of Classification Search
   CPC ....................... C03B 37/0142; C03B 37/01426
   USPC ................................................. 431/198, 200
   See application file for complete search history.

(56) References Cited

U.S. PATENT DOCUMENTS

| | | | |
|---|---|---|---|
| 2005/0223750 A1* | 10/2005 | Nutini et al. ..................... | 65/413 |
| 2005/0274150 A1* | 12/2005 | Onodera et al. ................. | 65/421 |
| 2006/0225464 A1* | 10/2006 | Saitou et al. .................... | 65/484 |
| 2009/0211300 A1* | 8/2009 | Yoshida .......................... | 65/415 |

FOREIGN PATENT DOCUMENTS

| | | | |
|---|---|---|---|
| CN | 101519271 A | | 9/2009 |
| EP | 1778597 A1 | * | 5/2007 |
| JP | H2-146136 U | | 12/1990 |
| JP | H4-160027 A | | 6/1992 |
| JP | 1773359 C | | 7/1993 |

(Continued)

OTHER PUBLICATIONS

Crane, "Flow of Fluids Through Valves, Fittings, and Pipe", Crane Co. Technical paper No. 410, p. 3-16, 1988.*

(Continued)

*Primary Examiner* — Matthew Daniels
*Assistant Examiner* — Lisa Herring

(57) ABSTRACT

Provided is a porous glass matrix producing burner 10, wherein a third gas jetting opening 17, which is the most outward one of a plurality of gas jetting openings, is clogged by a clogging member 19, and one line or plural lines of gas jetting holes 20 are provided in the clogging member 19 concentrically with respect to the center line of a glass material gas jetting port 11. Hence, there are provided a porous glass matrix producing burner that can have the cross-sectional area of its most outward gas jetting opening changed and can have the flow rate and linear velocity of a combustion improving gas adjusted to thereby suppress diffusion of the combustion improving gas and a combustible gas and improve deposition efficiency, and a porous glass matrix producing method using the porous glass matrix producing burner.

12 Claims, 8 Drawing Sheets

(56) References Cited

FOREIGN PATENT DOCUMENTS

| | | | |
|---|---|---|---|
| JP | 05323130 A | * | 12/1993 |
| JP | H05-323130 A | | 12/1993 |
| JP | 2003-165737 A | | 6/2003 |
| JP | 2003-206154 A | | 7/2003 |
| JP | 2003-212555 A | | 7/2003 |
| JP | 2003-226544 A | | 8/2003 |
| JP | 3543537 B2 | | 7/2004 |
| JP | 2004-331440 A | | 11/2004 |
| JP | 3591330 B2 | | 11/2004 |
| JP | 3653902 B2 | | 6/2005 |
| JP | 3744350 B2 | | 2/2006 |
| JP | 2006-182624 A | | 7/2006 |
| JP | 2012-041231 A | | 3/2012 |
| WO | 01/17918 A1 | | 3/2001 |

OTHER PUBLICATIONS

European Search Report for Application No./Patent No. 12188973.7-1218, dated Jan. 30, 2013.

Office Action issued for counterpart Chinese Application 201210398053.4, issued by the Chinese Patent Office on Sep. 29, 2014.

Office Action issued for counterpart Japanese Application 2011-229166, issued by the Japanese Patent Office on Nov. 18, 2014.

* cited by examiner

POROUS GLASS MATRIX PRODUCING BURNER AND POROUS GLASS MATRIX PRODUCING METHOD

CROSS REFERENCE TO RELATED APPLICATION

The contents of the following Japanese Patent Application is incorporated herein by reference:

No. 2011-229166 filed on Oct. 18, 2011

BACKGROUND

1. Technical Field

The present invention relates to a porous glass matrix producing burner and a porous glass matrix producing method.

2. Related Art

Various methods have been conventionally proposed for producing fiber optic matrices. Among these methods, OVD (Outside Vapor Phase Deposition) method is generally used. OVD method is known as a method by which it is relatively possible to obtain a fiber optic matrix having a desired refractive index distribution and by which it is possible to churn out fiber optic matrices having a large diameter.

In one example OVD method, at the first stage, while a starting matrix and a glass matrix producing burner are reciprocated with respect to each other, a flame including glass particles is sprayed from the glass matrix producing burner to the starting matrix to deposit glass particles (soot) on the starting matrix. At the next stage, the soot-deposited material is dewatered and sintered in an electric furnace to be turned into a transparent glass, as a result of which a fiber optic matrix is produced.

A concentric multiple tube burner made of silica glass has been used as the burner for synthesizing the deposits of glass particles. Because a concentric multiple tube burner cannot mix a glass material gas, a combustible gas, and a combustion improving gas sufficiently, it tends to result in producing an insufficient amount of glass particles. As a result, it has been impossible to increase the yield, and it has been difficult to synthesize glass particles at a high speed.

To solve this problem, Patent Document 1 proposes a multiple nozzle multiple tube burner. The multiple tube burner of Patent Document 1 has an annular combustible gas jetting opening around a material gas jetting port, and a plurality of small-diameter combustion improving gas jetting ports in the combustible gas jetting opening that are concentric with respect to the center axis of the material gas jetting port.

Many structures are proposed for the multiple tube burners of this type for further improving the deposition efficiency. For example, Patent Document 2, Patent Document 3, Patent Document 4, and Patent Document 5 are proposed for structures for small-diameter combustion improving gas jetting ports. Patent Document 6, Patent Document 7, and Patent Document 8 are proposed for optimization of the focal length of small-diameter combustion improving gas jetting ports. Patent Document 9, Patent Document 10, Patent Document 11, and Patent Document 12 are proposed for optimization of the gas flow rate and the gas linear velocity of a multiple tube burner.

[Patent Document 1] Japanese Patent No. 1773359
[Patent Document 2] Japanese Patent Application Publication No. 2003-206154
[Patent Document 3] Japanese Patent Application Publication No. 2004-331440
[Patent Document 4] Japanese Patent Application Publication No. 2006-182624
[Patent Document 5] Japanese Patent No. 3744350
[Patent Document 6] Japanese Patent Application Publication No. H5-323130
[Patent Document 7] Japanese Patent No. 3543537
[Patent Document 8] Japanese Patent Application Publication No. 2003-226544
[Patent Document 9] Japanese Patent No. 3591330
[Patent Document 10] Japanese Patent Application Publication No. 2003-165737
[Patent Document 11] Japanese Patent Application Publication No. 2003-212555
[Patent Document 12] Japanese Patent No. 3653902

SUMMARY

In the fabrication of a porous glass matrix producing burner, it is both difficult to make each tube thinner and to make the clearance between the tubes smaller. Thus, it is difficult to adjust the cross-sectional area of the gas jetting opening between the tubes in a desired manner, producing a tendency that more outward gas jetting openings have larger cross-sectional areas.

In order to increase the linear velocity of the most outward combustion improving gas in such a burner, it is necessary to increase the gas flow rate by more than necessary. However, if the flow rate of a combustion improving gas is increased by more than necessary, the temperature of the deposition surface decreases, thereby reducing the deposition efficiency.

According to one aspect of the present invention, provided is a porous glass matrix producing burner including: a plurality of annular gas jetting openings that are concentrically arranged outward from a glass material gas jetting port having a center axis; and one line or plural lines of small-diameter gas jetting ports that are arranged concentrically with respect to the center axis in any of the plurality of gas jetting openings other than a most outward gas jetting opening, the axis lines of those small-diameter gas jetting ports that are located on a same circumference among the small-diameter gas jetting ports having a crossing point on an extended line of the center axis, wherein the most outward gas jetting opening of the plurality of gas jetting openings is clogged by a clogging member, and one line or plural lines of gas jetting holes are provided in the clogging member concentrically with respect to the center axis.

According to another aspect of the present invention, in the porous glass matrix producing burner, the axis lines of the gas jetting holes may be inclined with respect to the center axis such that the axis lines of those gas jetting holes that are on a same circumference have a crossing point on the extended line of the center axis.

According to another aspect of the present invention, in the porous glass matrix producing burner, a combustion improving gas may be supplied to the most outward gas jetting opening, and a combustible gas may be supplied to the gas jetting opening adjacent to the most outward gas jetting opening.

According to another aspect of the present invention, in the porous glass matrix producing burner, the clogging member may have a thickness of 1.0 mm or larger.

According to another aspect of the present invention, in the porous glass matrix producing burner, the linear velocity of a gas passing through the gas jetting holes may be approximately 16 m/s, the gas jetting holes may be circular, and the inner diameter of the gas jetting holes may be 1.0 mm or smaller.

According to another aspect of the present invention, provided is a porous glass matrix producing method, involving use of a porous glass matrix producing burner comprising: a plurality of annular gas jetting openings that are concentrically arranged outward from a glass material gas jetting port having a center axis; and one line or plural lines of small-diameter gas jetting ports that are arranged concentrically with respect to the center axis in any of the plurality of gas jetting openings other than a most outward gas jetting opening, axis lines of those small-diameter gas jetting ports that are located on a same circumference among the small-diameter gas jetting ports having a crossing point on an extended line of the center axis, the method including: supplying a combustible gas and a combustion improving gas to the porous glass matrix producing burner; and depositing glass particles on a starting matrix of a porous glass matrix by spraying a flame including the glass particles to the starting matrix from the porous glass matrix producing burner while reciprocating the starting matrix and the porous glass matrix producing burner with respect to each other, wherein the most outward gas jetting opening of the plurality of gas jetting openings is clogged by a clogging member, and one line or plural lines of gas jetting holes are provided in the clogging member concentrically with respect to the center axis.

According to another aspect of the present invention, in the porous glass matrix producing method, the axis lines of the gas jetting holes may be inclined with respect to the center axis such that those gas jetting holes that are on a same circumference have a crossing point on the extended line of the center line.

According to another aspect of the present invention, in the porous glass matrix producing method, supplying the combustible gas and the combustion improving gas may include: supplying the combustion improving gas to the most outward gas jetting opening, and supplying the combustible gas to the gas jetting opening adjacent to the most outward gas jetting opening.

According to another aspect of the present invention, in the porous glass matrix producing method, the clogging member may have a thickness of 1.0 mm or larger.

According to another aspect of the present invention, in the porous glass matrix producing method, the linear velocity of a gas passing through the gas jetting holes may be approximately 16 m/s, the gas jetting holes may be circular, and the inner diameter of the gas jetting holes may be 1.0 mm or smaller.

DESCRIPTION OF EXEMPLARY EMBODIMENTS

Hereinafter, some embodiments of the present invention will be described, but the embodiments do not limit the invention according to the claims. And all the combinations of the features described in the embodiments are not necessarily essential to means provided by aspects of the invention.

Figure 1:
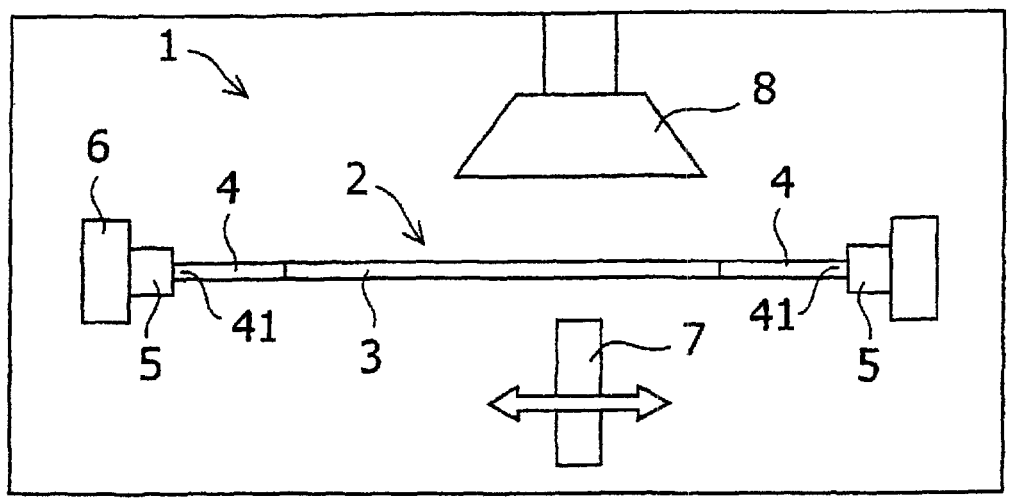
FIG. 1 is a schematic diagram of a porous glass matrix producing apparatus 1.

FIG. 1 is a schematic diagram of a porous glass matrix producing apparatus 1 according to an embodiment of the present invention.

The porous glass matrix producing apparatus 1 of FIG. 1 is an apparatus using OVD method. As shown in FIG. 1, a starting matrix 2 includes a core rod 3, and dummy rods 4 are welded to both ends of the core rod 3. The ends 41 of the dummy rods 4 are rotatably supported by base material supporting members 5. As shown in FIG. 1, the base material supporting members 5 are attached to a rotary motor 6, and with the rotary motor 6 started, the starting matrix 2 is rotated about its axis.

As shown in FIG. 1, a burner device 7 is provided below the starting matrix 2 in a manner to be freely reciprocable by an unillustrated moving mechanism along the longer direction of the starting matrix 2. Normally, a plurality of porous glass matrix producing burners 10 (see FIG. 2 and FIG. 3) are attached to the burner device 7. On the other hand, as shown in FIG. 1, a gas evacuation hood 8 is provided above the starting matrix 2.

Next, a porous glass matrix producing method using OVD method will be explained with reference to FIG. 1.

First, the starting matrix 2 supported by the base material supporting members 5 is rotated about its axis by the rotary motor 6.

Next, vapor of $SiCl_4$ or the like as a glass material for fiber, and a combustion gases (hydrogen gas and oxygen gas) are supplied to the burner device 7. The burner device 7 jets vapor containing the glass material for fiber and a flame toward the starting matrix 2 while reciprocating along the longer direction of the starting matrix 2. During this, a hydrolysis reaction of $SiCl_4$ or the like in the oxyhydrogen flame produces glass particles (soot), which will adhere onto the starting matrix 2 rotating about its axis.

Through the step described above, in the range of reciprocation of the burner device 7, glass particles adhere to the starting matrix 2 to be deposited thereon, producing a soot-deposited material, i.e., a porous glass matrix for fiber optics.

Finally, the glass particles are dewatered and sintered in an electric furnace (unillustrated) to be turned into a transparent glass, thereby producing a fiber optic matrix. Next, a porous glass matrix producing burner 10 used in the burner device 7 shown in FIG. 1 will be explained.

[First Embodiment]

Figure 2:
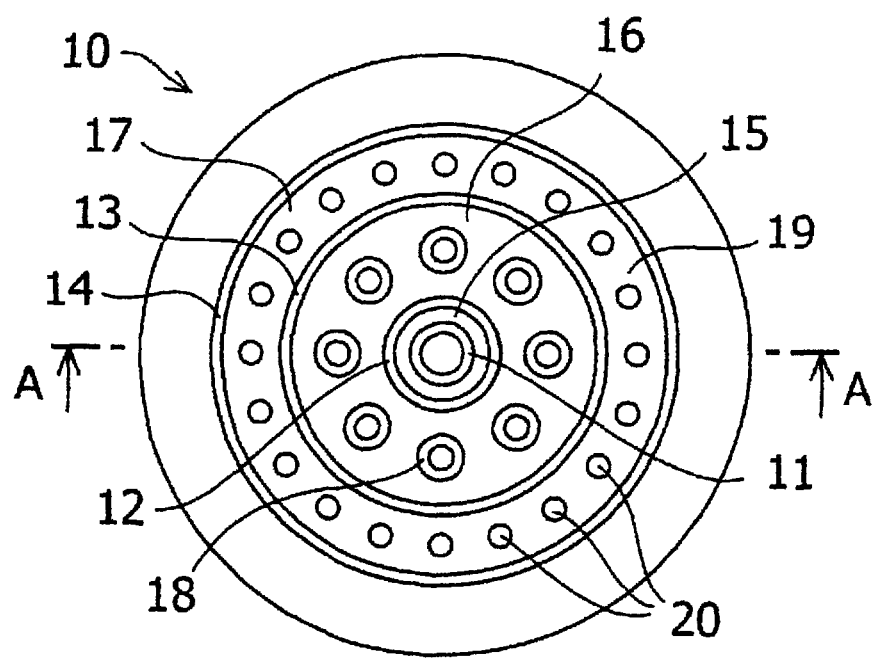
FIG. 2 is a plan view of a porous glass matrix producing burner 10 as seen from a gas jetting openings' side.

FIG. 2 is a plan view of a porous glass matrix producing burner according to the first embodiment, as seen from a gas jetting ports' side.

Figure 3:
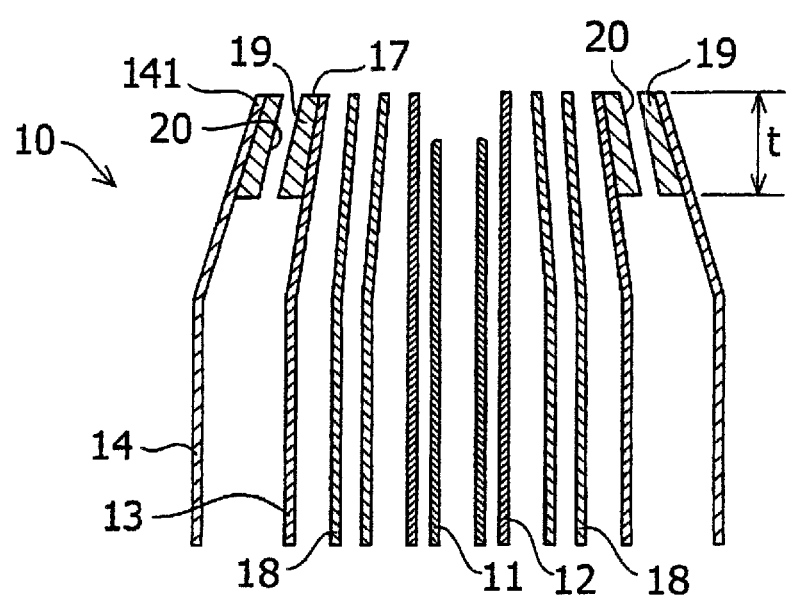
FIG. 3 is a cross-sectional diagram of FIG. 2 as taken along a line A-A.
Figure 4:
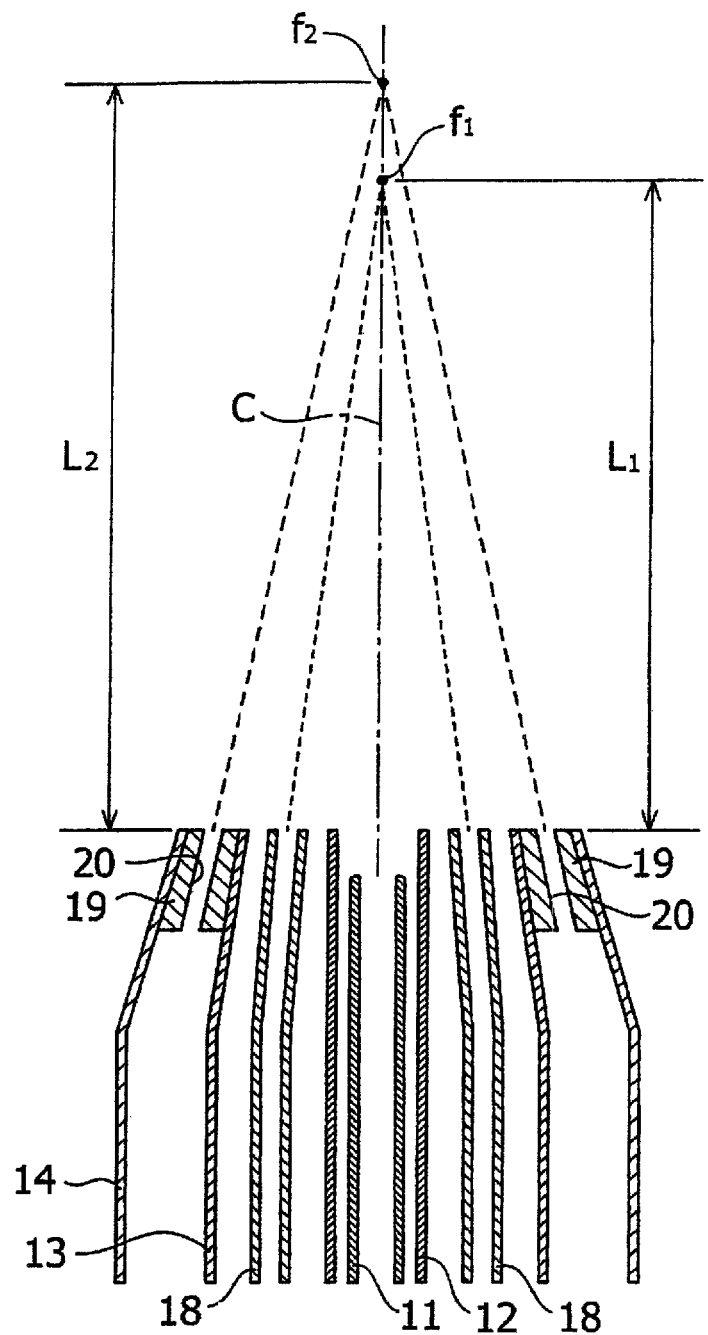
FIG. 4 is a cross-sectional diagram of FIG. 2 as taken along a line A-A showing the focal point of smaller-diameter combustion improving gas jetting ports and gas jetting holes.

FIG. 3 and FIG. 4 are cross-sectional diagrams of FIG. 2 as taken along a line A-A.

As shown in FIG. 2 and FIG. 3, the porous glass matrix producing burner 10 according to the first embodiment has a multiple tube structure including four tubes, and can be made of a material mainly composed of silica glass. Here, a multiple tube structure is one that has a first tube 11 in the center and a plurality of tubes having diameters larger than that of the first tube 11 arranged around the first tube 11 sequentially, and that can jet gases, etc. from the first tube 11 in the center and from between the tubes.

The porous glass matrix producing burner 10 includes a first tube (glass material gas jetting port) 11 having a center axis C (see FIG. 4), a second tube 12 arranged around the first tube 11, a third tube 13 arranged around the second tube 12, and a fourth tube 14 arranged around the third tube 13.

As shown in FIG. 2 and FIG. 3, the first tube 11 jets out a glass material gas. $SiCl_4$, $GeCl_4$, etc. can be raised as examples of glass material gases to be supplied to the first tube 11. A flame hydrolysis reaction or an oxidization reaction of these glass material gases produces a compound from which glass will be produced, glass particles, etc. That is, either one or both of glass particles synthesized in advance and a material from which glass particles will be produced in the flame can be used in the porous glass matrix producing burner 10 according to the present embodiment.

As shown in FIG. 2 and FIG. 3, an annular first gas jetting opening 15 is provided between the first tube 11 and the second tube 12, and the first gas jetting opening 15 jets out a sealing gas. Inert gas such as $N_2$, etc. can be used as the sealing gas.

As shown in FIG. 2 and FIG. 3, an annular second gas jetting opening 16 is provided between the second tube 12 and the third tube 13, and the second gas jetting opening 16 jets out a combustible gas. Hydrogen or a hydrocarbon compound, such as methane, propane, etc. can be used as the combustible gas.

As shown in FIG. 2 and FIG. 3, an annular third gas jetting opening 17 is provided between the third tube 13 and the fourth tube 14, and the third gas jetting opening 17 jets out a combustion improving gas. Oxygen, air, or, the like can be used as the combustion improving gas.

As shown in FIG. 2, eight small-diameter combustion improving gas jetting ports 18 are arranged in the second gas jetting opening 16 between the second tube 12 and the third tube 13 in a manner that they are concentric with respect to the center axis C (see FIG. 4) of the first tube 11. As shown in FIG. 4, axis lines of the small-diameter combustion improving gas jetting ports 18 cross at a point $f_1$ that is located on an extended line of the center axis C of the first tube 11. The point at which the axis lines cross will hereinafter be referred to as "focal point".

This focal point needs not strictly be one point on the extended line of the center axis C of the first tube 11, but it is enough if the extended lines of the axis lines of the small-diameter combustion improving gas jetting ports 18 converge at roughly one point. In the present embodiment, the distance from the top end of the porous glass matrix producing burner 10 to the crossing point $f_1$, i.e., the focal length $L_1$ is set to approximately 150 mm.

In the present embodiment, as shown in FIG. 2 and FIG. 3, the third gas jetting opening 17 located at the most outward position in the porous glass matrix producing burner 10 is clogged by a clogging member 19. As shown in FIG. 3, the clogging member 19 is welded to a top end portion 141 of the fourth tube 14 and to a top end portion of the third tube 13. The material of the clogging member 19 may be the same as that of the burner itself, and may be, for example, silica glass.

As shown in FIG. 2 and FIG. 3, a plurality of circular gas jetting holes 20 are provided in the clogging member 19 in a manner that they are concentric with respect to the center axis C (see FIG. 4). The shape of the gas jetting holes 20 is preferably a circular shape, but is not limited to this. Boring of the gas jetting holes 20 by using a drill or the like is easy, if they are to be bored into circular shapes.

Further, the number of gas jetting holes 20, the inner diameter of the gas jetting holes 20, etc. are easy to change if they are to be bored into circular shapes, which provides an advantage that the degree of latitude when adjusting the cross-sectional area of the flow passages of the combustion improving gas is increased. Furthermore, as shown in FIG. 4, the line of gas jetting holes 20 provided in the clogging member 19 have axes that are inclined with respect to the center axis C of the first tube 11, such that they have the same focal point $f_2$.

The thickness t of the clogging member 19 is preferably 1 mm or larger. Such a thickness can provide an appropriate resistance to the combustion improving gas passing therethrough. This will provide a uniform linear velocity distribution in each gas jetting hole 20, and improves the possibility of convergence that the lines of combustion improving gas passed through the gas jetting holes 20 will converge at the focal point $f_2$.

According to the porous glass matrix producing burner 10 of the first embodiment of the present invention, the third gas jetting opening 17 located at the most outward position in the porous glass matrix producing burner 10 is clogged by the clogging member 19, and the plurality of circular gas jetting holes 20 are provided in the clogging member 19 concentrically with respect to the center axis C.

This reduces the cross-sectional area of the third gas jetting opening 17 located at the most outward position, which makes the linear velocity of the combustion improving gas greater with respect to the flow rate thereof. This can prevent diffusion of the combustion improving gas to be jetted out from the third gas jetting opening 17 located at the most outward position and the combustible gas to be jetted out from the second gas jetting opening 16 adjacent to the third gas jetting opening 17, and improve the deposition efficiency of glass particles.

According to the porous glass matrix producing burner 10 of the first embodiment of the present invention, the axes of the line of the gas jetting holes 20 provided in the clogging member 19 are inclined with respect to the center axis C such that the axes of the gas jetting holes 20 cross one another on the extended line of the center axis C of the first tube 11.

Accordingly, it is possible to more effectively prevent diffusion of the combustion improving gas to be jetted out from the third gas jetting opening 17 located at the most outward position. Furthermore, since the combustion improving gas passed through the third gas jetting opening 17 is jetted out toward the extended line of the center axis C to be converged thereon, it exerts an effect of confining the combustible gas passed through the second gas jetting opening 16 located at a more inward position than the third gas jetting opening 17, which enables more effective prevention of gas diffusion.

According to the porous glass matrix producing burner 10 of the first embodiment of the present invention, the second gas jetting opening 16 jets out a combustible gas and the third gas jetting opening 17 jets out a combustion improving gas.

According to the configuration of the present embodiment, because the linear velocity of the combustion improving gas passing through the third gas jetting opening 17 located at the most outward position becomes faster, it becomes less likely that the top end portion of the burner is burned. Hence, it is unnecessary to let flow an inert gas between the combustible gas and the combustion improving gas in order to prevent the top end portion of the burner from being burned. Accordingly, it is possible to let the combustible gas and the combustion improving gas be jetted out in proximity to each other with no need of providing a tube to let flow an inert gas through. As a result, because no inert gas is used, the temperature of the deposition surface can be prevented from being lowered by any inert gas, which will improve the deposition efficiency.

[Second Embodiment]

Figure 5:
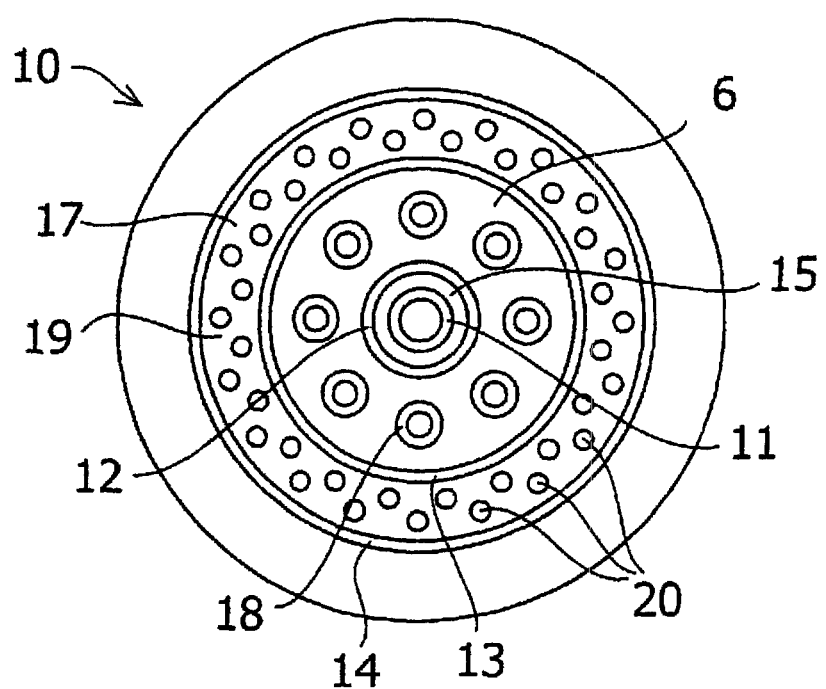
FIG. 5 is a plan view of a porous glass matrix producing burner 10 as seen from a gas jetting openings' side.

FIG. 5 is a plan view of a porous glass matrix producing burner 10 according to the second embodiment as seen from a gas jetting openings' side. Any components that are the same as those explained in the foregoing embodiment will be denoted by the same reference numerals and any repetitive explanation about them will not be provided.

As shown in FIG. 5, in the present embodiment, circular gas jetting holes 20 provided in the clogging member 19 are arranged in two lines, and these two lines of gas jetting holes 20 are arranged concentrically with respect to the center axis C. Here, those gas jetting holes 20 that are on the same circumference have the same focal point. That is, the axes of the gas jetting holes 20 located on the same circumference cross one another on the extended line of the center axis C (see FIG. 4).

Next, in the present embodiment, the linear velocity of the combustion improving gas and the deposition efficiency of glass particles were measured by changing the flow rate of the combustion improving gas to be supplied to the fourth tube 14 (i.e., the flow rate of the combustion improving gas to pass through the third gas jetting opening 17). The result of the measurement is shown in Table 1.

The combustion improving gas to be supplied to the fourth tube 14 was $O_2$. The configuration of the gas jetting holes 20 was the two-line configuration shown in FIG. 5, and there were forty gas jetting holes 20. The inner diameter of the gas jetting holes 20 was set to 0.8 mm, and the focal length $L_2$ from the top end of the burner to the focal point $f_2$ (see FIG. 4) was set to 300 mm.

In this experiment, $SiCl_4$ as a glass material gas was supplied at 10 L/min and $O_2$ as a combustion improving gas was supplied at 12 L/min to the first tube 31. Air as a sealing gas was supplied at 4 L/min to the second tube 32, and $H_2$ as a combustible gas was supplied at 170 L/min to the third tube 33.

In this experiment, four porous glass matrix producing burners 10 were arranged at 150-mm intervals, and 130 kg of porous glass particles were deposited on the staring matrix material 2. The starting matrix 2 that was used had an outer diameter of 55 mm and included a core rod 3 having a length of 2000 mm to both ends of which dummy rods 4 having an outer diameter of 50 mm were welded.

TABLE 1

|  |  | Example A | Example B | Example C |
|---|---|---|---|---|
| Diameter of holes | mm | 0.8 | 0.8 | 0.8 |
| Number of holes | Holes | 40 | 40 | 40 |
| Flow rate of Fourth tube | L/min | 10 | 20 | 30 |
| Linear velocity of Fourth tube | m/s | 8.3 | 16.6 | 24.9 |
| Deposition efficiency | % | 65 | 70 | 68 |

As can be seen from Table 1, although the flow rate of the combustion improving gas supplied to the fourth tube 14 was low, the linear velocity of the combustion improving gas increased greatly. Particularly, even when the gas flow rate was reduced to 10 L/min, the linear velocity of the combustion improving gas was faster than in Table 3 to be shown below, which means that diffusion of the gases and diffusion of the flame were suppressed. When the gas flow rate was set to 20 L/min, the deposition efficiency was improved to 70%.

Then, another experiment was conducted. In this experiment, the deposition efficiency of glass particles was measured by changing the diameter and number of gas jetting holes 20 while keeping the flow rate (20 L/min) of the combustion improving gas to be supplied to the fourth tube 14 and the linear velocity (approximately 16 m/s) of the combustion improving gas constant. The other conditions were the same as in the experiment of Table 1.

TABLE 2

|  |  | Example D | Example B | Example E | Example F |
|---|---|---|---|---|---|
| Diameter of holes | mm | 0.6 | 0.8 | 1.0 | 1.2 |
| Number of holes | Holes | 71 | 40 | 23 | 18 |
| Flow rate of Fourth tube | L/min | 20 | 20 | 20 | 20 |
| Linear velocity of Fourth tube | m/s | 16.6 | 16.6 | 16.7 | 16.4 |
| Deposition efficiency | % | 70 | 70 | 68 | 66 |

From the experiment of Table 2, it can be seen that when the linear velocity of the combustion improving gas was approximately 16 m/s, it is preferable if the inner diameter of the gas jetting holes 20 is 1.0 mm or smaller, because in such a case, the deposition efficiency was greater.

Meanwhile, in Example F, the deposition efficiency was 66%, which was lower than in the other Examples. This is because the number of gas jetting holes 20 was as small as 18, which widened the interval between the holes to let a slight amount of the combustible gas diffuse from the intervals. In Example F of Table 2, the interval between the holes was 4.5 mm. On the other hand, in Example E in which the deposition efficiency was 68%, the interval between the holes was 3.5 mm, and in Example B in which the deposition efficiency was 70%, the interval between the holes was 2.0 mm. Accordingly, when the linear velocity of the combustion improving gas is approximately 16 m/s, such an arrangement of the holes is preferable in which the diameter is 1 mm or smaller and the interval between the holes is 2.0 mm or smaller.

From the above experiment, provided that the linear velocity of the combustion improving gas is constant, a smaller diameter of the gas jetting holes 20 and a larger number of gas jetting holes to make the interval between the holes smaller will increase the effect of confining the combustible gas flowing through a more inward opening than the combustion improving gas, which makes it possible to suppress diffusion of the combustible gas. As a result, the deposition efficiency will improve.

According to the porous glass matrix producing burner 10 of the second embodiment of the present invention, when the linear velocity of the combustion improving gas is approximately 16 m/s, setting the inner diameter of the gas jetting holes 20 to 1.0 mm or smaller can obtain a greater effect of confining the combustible gas passed through the second gas jetting opening 16 that is more inward than the third gas jetting opening 17, and can more effectively suppress diffusion of the gases.

In this way, there were provided a porous glass matrix producing burner in which the cross-sectional area of the gas jetting opening located at the most outward position can be changed and the flow rate and linear velocity of the combustion improving gas can be adjusted to make it possible to suppress diffusion of the combustion improving gas and the combustible gas and to improve the deposition efficiency, and a porous glass matrix producing method using the porous glass matrix producing burner.

COMPARATIVE EXAMPLE

Figure 6:
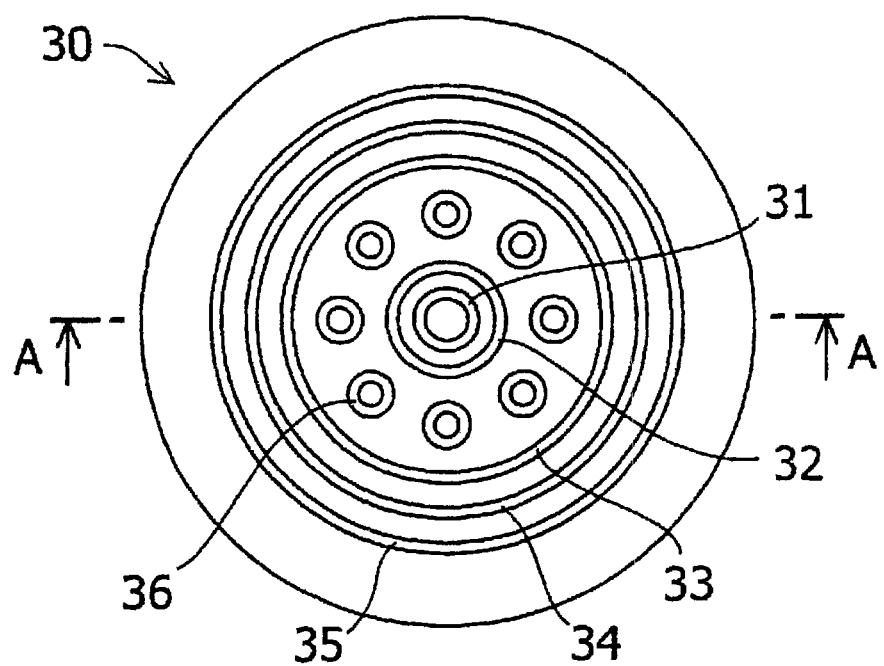
FIG. 6 is a plan view of a porous glass matrix producing burner 30 as seen from a gas jetting openings' side.
Figure 7:
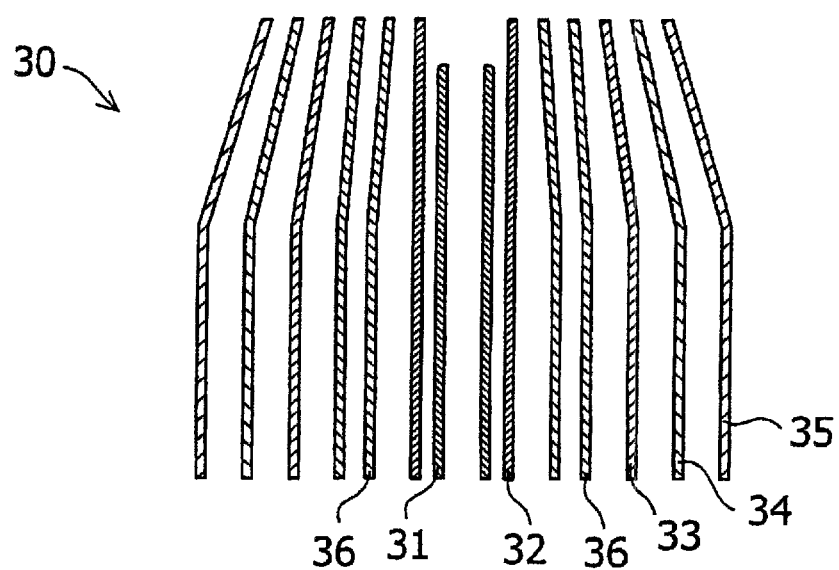
FIG. 7 is a cross-sectional diagram of FIG. 6 as taken along a line A-A.
Figure 8:
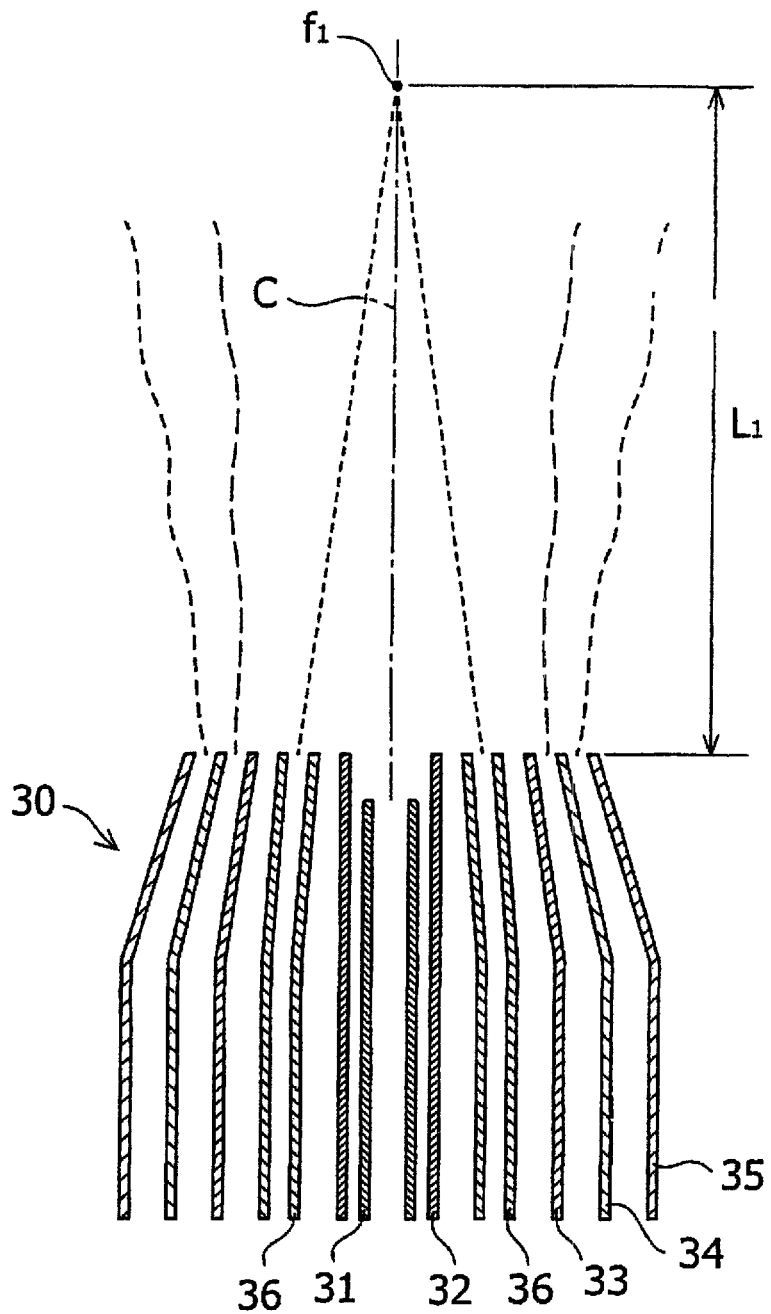
FIG. 8 is a diagram showing diffusion of gases jetted out by a porous glass matrix producing burner 30.

FIG. 6, FIG. 7, and FIG. 8 show a multiple tube burner as a comparative example. As shown in FIG. 6 and FIG. 7, a porous glass matrix producing burner 30 has a five-tube structure.

The porous glass matrix producing burner 30 includes a first tube 31 having a center axis C (see FIG. 8), a second tube 32 arranged around the first tube 31, a third tube 33 arranged around the second tube 32, a fourth tube 34 arranged around the third tube 33, and a fifth tube 35 arranged around the fourth tube 34.

As shown in FIG. 6, eight small-diameter combustion improving gas jetting ports 36 are arranged between the second tube 32 and the third tube 33 concentrically with respect to the center axis C of the first tube 31. As shown in FIG. 8, the axis lines of the small-diameter combustion improving gas jetting ports 36 have a crossing point $f_1$ (i.e., a focal point) on the extended line of the center axis C of the first tube 31, and the distance (focal length) $L_1$ from the top end of the porous glass matrix producing burner 30 to the crossing point $F_1$ is set to 150 mm.

In the comparative example, $SiCl_4$ as a glass material gas is supplied at 10 L/min and $O_2$ as a combustion improving gas is supplied at 12 L/min to the first tube 31. Air as a sealing gas is supplied at 4 L/min to the second tube 32 and $H_2$ as a combustible gas is supplied at 170 L/min to the third tube 33. $N_2$ as a sealing gas is supplied at 5 L/min to the fourth tube 34, and $O_2$ as a combustion improving gas is supplied at 25 L/min to the small-diameter combustion improving gas jetting ports 36.

An experiment shown in Table 3 was conducted on the comparative example. In this experiment, the linear velocity of the combustion improving gas and the deposition efficiency of glass particles were measured by changing the flow rate of the combustion improving gas to be supplied to the fifth tube 35. In this experiment, four porous glass matrix producing burners 30 were arranged at 150-mm intervals, and 130 kg of porous glass particles was deposited on a starting matrix. The starting matrix that was used in the experiment had an outer diameter of 55 mm, and included a core rod having a length of 2000 mm to both ends of which dummy rods having an outer diameter of 50 mm were welded.

TABLE 3

| | | Comparative Example A | Comparative Example B | Comparative Example C |
|---|---|---|---|---|
| Flow rate of Fifth tube | L/min | 20 | 40 | 60 |
| Linear velocity of Fifth tube | m/s | 1.2 | 2.4 | 3.6 |
| Deposition efficiency | % | 60 | 65 | 57 |

In the experiment, the linear velocity of the combustion improving gas to be jetted out from the fifth tube 35 were low in all of the Comparative Examples A, B, and C above, and diffusion of the gases and divergence of the flame were wide as shown in FIG. 8. In the Comparative Example, C, the flow rate of the combustion improving gas from the fifth tube 35 was so high that the temperature of the deposition surface decreased and consequently the deposition effect decreased greatly.

Meanwhile, when the flow rate of the combustion improving gas was reduced, the linear velocity decreased. Such a decreased linear velocity of the combustion improving gas increased diffusion of the gases and fluctuation of the flame as shown in FIG. 8. As a result, the deposition effect was poor.

When the linear velocity of the combustion improving gas is low, the top end portion of the tubes will be burned if the combustible gas and the combustion improving gas are jetted out in proximity to each other. Hence, as in the structure shown in FIG. 6 and FIG. 7, it cannot be helped but to provide the fourth tube 34 between the third tube 33 to jet out the combustible gas and the fifth tube 35 to jet out the combustion improving gas to let flow an inert gas through the fourth tube 34. However, if the inert gas impinges on the deposition surface of gas particles, the temperature of the deposition surface will decrease and the deposition effect will consequently decrease.

As described above, in the porous glass matrix producing burner 10 according to the embodiments, a plurality of annular gas jetting openings are concentrically arranged outward from the glass material gas jetting port having a center axis. Further, a line or plural lines of small-diameter gas jetting ports are arranged concentrically with respect to the center axis in any of the plurality of gas jetting openings other than the one that is located at the most outward position. Furthermore, among the small-diameter gas jetting ports, those small-diameter gas jetting ports that are on the same circumference have a crossing point on the extended line of the center axis.

Hence, in the porous glass matrix producing burner 10, among the plurality of gas jetting openings, the most outward gas jetting opening is clogged by the clogging member, and a line or plural lines of gas jetting holes are provided in the clogging member concentrically with respect to the center axis. This reduces the cross-sectional area of the most outward gas jetting opening, and increases the linear velocity of the gas with respect to the flow rate of the gas. Hence, diffusion of the gas to be jetted out from the most outward gas jetting opening and the gas to be jetted out in proximity of this gas is suppressed, enabling the deposition efficiency of glass particles to be improved.

Further, according to the embodiments described above, the axes of the gas jetting holes are inclined with respect to the center axis such that the axes of the gas jetting holes that are on the same circumference have a crossing point on the extended line of the center axis. This allows the gas passing through the most outward gas jetting opening to be jetted out to be converged on the extended line of the center axis, making it possible to more effectively suppress diffusion of the gas jetted out from the most outward gas jetting opening.

Furthermore, in the embodiments described above, since the gas passing through the most outward gas jetting opening is jetted out to be converged on the extended line of the center axis, it exerts an effect of confining another gas passed through an opening that is inward from the most outward gas jetting opening, which enables more effective suppression of also this inward gas. Accordingly, it is possible to further improve the deposition efficiency of glass particles.

According to another aspect, a combustion improving gas is supplied to the most outward gas jetting opening, and a combustible gas is supplied to the gas jetting opening adjacent to the most outward gas jetting opening.

According to the embodiments described above, the linear velocity of the gas passing through the most outward gas jetting opening is increased. Hence, burning of the top end portion of the burner is prevented, which makes it unnecessary to let flow an inert gas. Hence, it is possible to form such a structure in which the combustible gas and the combustion improving gas are jetted out in proximity to each other, with no tube provided that are for letting flow an inert gas. As a result, it is possible to prevent the temperature of the deposition surface from being reduced by an inert gas, and thereby to improve the deposition effect.

According to another aspect of the present invention, since the thickness of the clogging member is 1.0 mm or larger, the clogging member keeps a suitable resistance against the gas passing through the most outward gas jetting opening, and is hence securely held within the gas jetting opening without being influenced by the passing gas. This reduces unevenness of the linear velocity in each gas jetting hole, and makes the linear velocity distribution in each gas jetting hole uniform. As a result, the deposition effect will be improved further.

According to another aspect of the present invention, since the linear velocity of the gas passing through the gas jetting holes is approximately 16 m/s, the gas jetting holes are circular, and the inner diameter of the gas jetting holes is 1.0 mm or smaller, a greater effect of confinement can be exerted on a gas that is passing more inward from the gas that is passing through the most outward gas jetting opening, which makes it possible to more effectively suppress diffusion of the gas.

In the embodiments described above, described were the cases where the gas jetting holes 20 are provided in one line or two lines. However, the number of lines of the gas jetting holes 20 is not limited to one or two, and there may be provided three or more lines.

In the embodiments described above, the burner device 7 is reciprocated in the longer direction of the starting matrix 2 by a moving mechanism, but it is only necessary that the starting matrix 2 and the burner device 7 are reciprocated with respect to each other. Accordingly, it is possible to attach the starting matrix 2 to a moving mechanism to move the starting matrix 2 with respect to the burner device 7.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. A porous glass matrix producing burner, comprising: a plurality of annular gas jetting openings that are concentrically arranged outward from a glass material gas jetting port having a center axis; and one line or plural lines of small-diameter gas jetting ports that are arranged concentrically with respect to the center axis in any of the plurality of annular gas jetting openings other than a most outward annular gas jetting opening, axis lines of those small-diameter gas jetting ports that are located on a same circumference among the small-diameter gas jetting ports having a crossing point on an extended line of the center axis,
wherein the most outward annular gas jetting opening of the plurality of annular gas jetting openings is clogged by a clogging member, and one line or plural lines of gas jetting holes are provided in the clogging member concentrically with respect to the center axis such that a flow rate of a combustion improving gas supplied to the most outward annular gas jetting opening of around 10 L/min results in a linear velocity of the combustion improving gas supplied to the most outward annular gas jetting opening of around 8.3 m/s, and
wherein the combustion improving gas is supplied to the most outward annular gas jetting opening, and a combustible gas is supplied to the annular gas jetting opening adjacent to the most outward annular gas jetting opening, with no inert gas being used in the most outward annular gas jetting opening or the annular gas jetting opening adjacent to the most outward annular gas jetting opening.

2. The porous glass matrix producing burner according to claim 1,
wherein axis lines of the gas jetting holes are inclined with respect to the center axis such that the axis lines of those gas jetting holes that are on a same circumference have a crossing point on the extended line of the center axis.

3. The porous glass matrix producing burner according to claim 1,
wherein the clogging member has a thickness of 1.0 mm or larger.

4. The porous glass matrix producing burner according to claim 1,
wherein the gas jetting holes are circular and inner diameter of the gas jetting holes is 1.0 mm or smaller.

5. A porous glass matrix producing burner, comprising: a plurality of annular gas jetting openings that are concentrically arranged outward from a glass material gas jetting port having a center axis; and one line or plural lines of small-diameter gas jetting ports that are arranged concentrically with respect to the center axis in any of the plurality of annular gas jetting openings other than a most outward annular gas jetting opening, axis lines of those small-diameter gas jetting ports that are located on a same circumference among the small-diameter gas jetting ports having a crossing point on an extended line of the center axis,
wherein the most outward annular gas jetting opening of the plurality of annular gas jetting openings is clogged by a clogging member, and one line or plural lines of gas jetting holes are provided in the clogging member concentrically with respect to the center axis such that a flow rate of a combustion improving gas supplied to the most outward annular gas jetting opening of around 20 L/min results in a linear velocity of the combustion improving gas supplied to the most outward annular gas jetting opening of around 16.6 m/s, and
wherein the combustion improving gas is supplied to the most outward annular gas jetting opening, and a combustible gas is supplied to the annular gas jetting opening adjacent to the most outward annular gas jetting opening, with no inert gas being used in the most outward annular gas jetting opening or the annular gas jetting opening adjacent to the most outward annular gas jetting opening.

6. The porous glass matrix producing burner according to claim 5,
wherein axis lines of the gas jetting holes are inclined with respect to the center axis such that the axis lines of those gas jetting holes that are on a same circumference have a crossing point on the extended line of the center axis.

7. The porous glass matrix producing burner according to claim 5,
wherein the clogging member has a thickness of 1.0 mm or larger.

8. The porous glass matrix producing burner according to claim 5,
wherein the gas jetting holes are circular and inner diameter of the gas jetting holes is 1.0 mm or smaller.

9. A porous glass matrix producing burner, comprising: a plurality of annular gas jetting openings that are concentrically arranged outward from a glass material gas jetting port having a center axis; and one line or plural lines of small-diameter gas jetting ports that are arranged concentrically with respect to the center axis in any of the plurality of annular gas jetting openings other than a most outward annular gas jetting opening, axis lines of those small-diameter gas jetting ports that are located on a same circumference among the small-diameter gas jetting ports having a crossing point on an extended line of the center axis,
wherein the most outward annular gas jetting opening of the plurality of annular gas jetting openings is clogged by a clogging member, and one line or plural lines of gas jetting holes are provided in the clogging member concentrically with respect to the center axis such that a flow rate of a combustion improving gas supplied to the most outward annular gas jetting opening of around 30 L/min results in a linear velocity of the combustion improving gas supplied to the most outward annular gas jetting opening of around 24.9 m/s, and wherein the combustion improving gas is supplied to the most outward annular gas jetting opening, and a combustible gas is supplied to the annular gas jetting opening adjacent to the most outward annular gas jetting opening, with no inert gas being used in the most outward annular gas jetting opening or the annular gas jetting opening adjacent to the most outward annular gas jetting opening.

10. The porous glass matrix producing burner according to claim 9,
wherein axis lines of the gas jetting holes are inclined with respect to the center axis such that the axis lines of those gas jetting holes that are on a same circumference have a crossing point on the extended line of the center axis.

11. The porous glass matrix producing burner according to claim 9,
wherein the clogging member has a thickness of 1.0 mm or larger.

12. The porous glass matrix producing burner according to claim 9,
wherein the gas jetting holes are circular and inner diameter of the gas jetting holes is 1.0 mm or smaller.

* * * * *